United States Patent
Parla et al.

(10) Patent No.: US 10,027,627 B2
(45) Date of Patent: Jul. 17, 2018

(54) CONTEXT SHARING BETWEEN ENDPOINT DEVICE AND NETWORK SECURITY DEVICE USING IN-BAND COMMUNICATIONS

(71) Applicant: Cisco Technology, Inc., San Jose, CA (US)

(72) Inventors: Vincent E. Parla, North Hampton, NH (US); Hari Shankar, San Jose, CA (US); Constantinos Kleopa, Clarksville, MD (US); Venkatesh N. Gautam, Sunnyvale, CA (US); Gerald N. A. Selvam, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 14/877,116

(22) Filed: Oct. 7, 2015

(65) Prior Publication Data
US 2017/0104722 A1   Apr. 13, 2017

(51) Int. Cl.
*H04L 29/00* (2006.01)
*H04L 29/06* (2006.01)

(52) U.S. Cl.
CPC ...... *H04L 63/0281* (2013.01); *H04L 63/0254* (2013.01); *H04L 63/1425* (2013.01)

(58) Field of Classification Search
CPC .................. H04L 63/0281; H04L 63/0254
USPC ......................................................... 726/12
See application file for complete search history.

(56) References Cited

U.S. PATENT DOCUMENTS

| | | | |
|---|---|---|---|
| 7,849,507 B1 * | 12/2010 | Bloch | H04L 29/12066 726/22 |
| 8,001,610 B1 | 8/2011 | Chickering et al. | |
| 8,239,915 B1 | 8/2012 | Satish et al. | |
| 8,800,045 B2 | 8/2014 | Curtis et al. | |
| 8,984,581 B2 | 3/2015 | Luna et al. | |
| 9,027,125 B2 | 5/2015 | Kumar et al. | |
| 2004/0148425 A1 * | 7/2004 | Haumont | H04L 29/06027 709/236 |
| 2008/0141373 A1 * | 6/2008 | Fossen | G06F 21/564 726/23 |
| 2011/0321150 A1 | 12/2011 | Gluck | |

* cited by examiner

*Primary Examiner* — Brandon Hoffman
*Assistant Examiner* — Michael D Anderson
(74) *Attorney, Agent, or Firm* — Edell, Shapiro & Finnan, LLC

(57) ABSTRACT

A network security device (NSD) is connected between a network and an endpoint device configured to host a client application. The client application communicates with the network through the network security device using a request-response protocol. The NSD receives from the client application a request destined for the network and that seeks a response from the network. The request has a context header including context information about the client application. The NSD determines whether the client application or a file accessed thereby has a suspicious nature based on the context information. If it is determined that the client application or the file accessed thereby has a suspicious nature, the NSD blocks the request from the network, and sends to the client application a response indicating the block.

22 Claims, 10 Drawing Sheets

IN-BAND CONTEXT SHARING NETWORK ENVIRONMENT 100

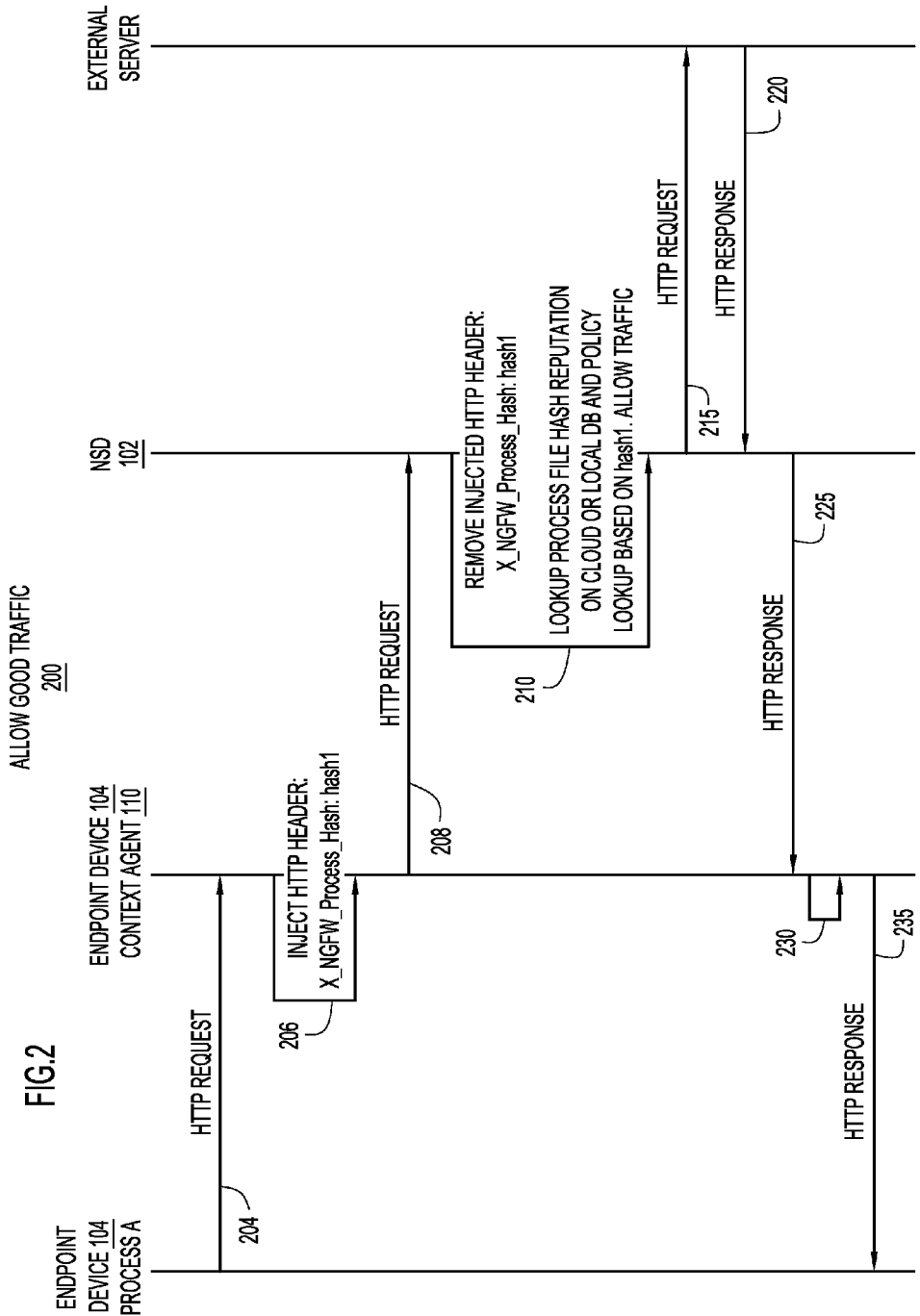

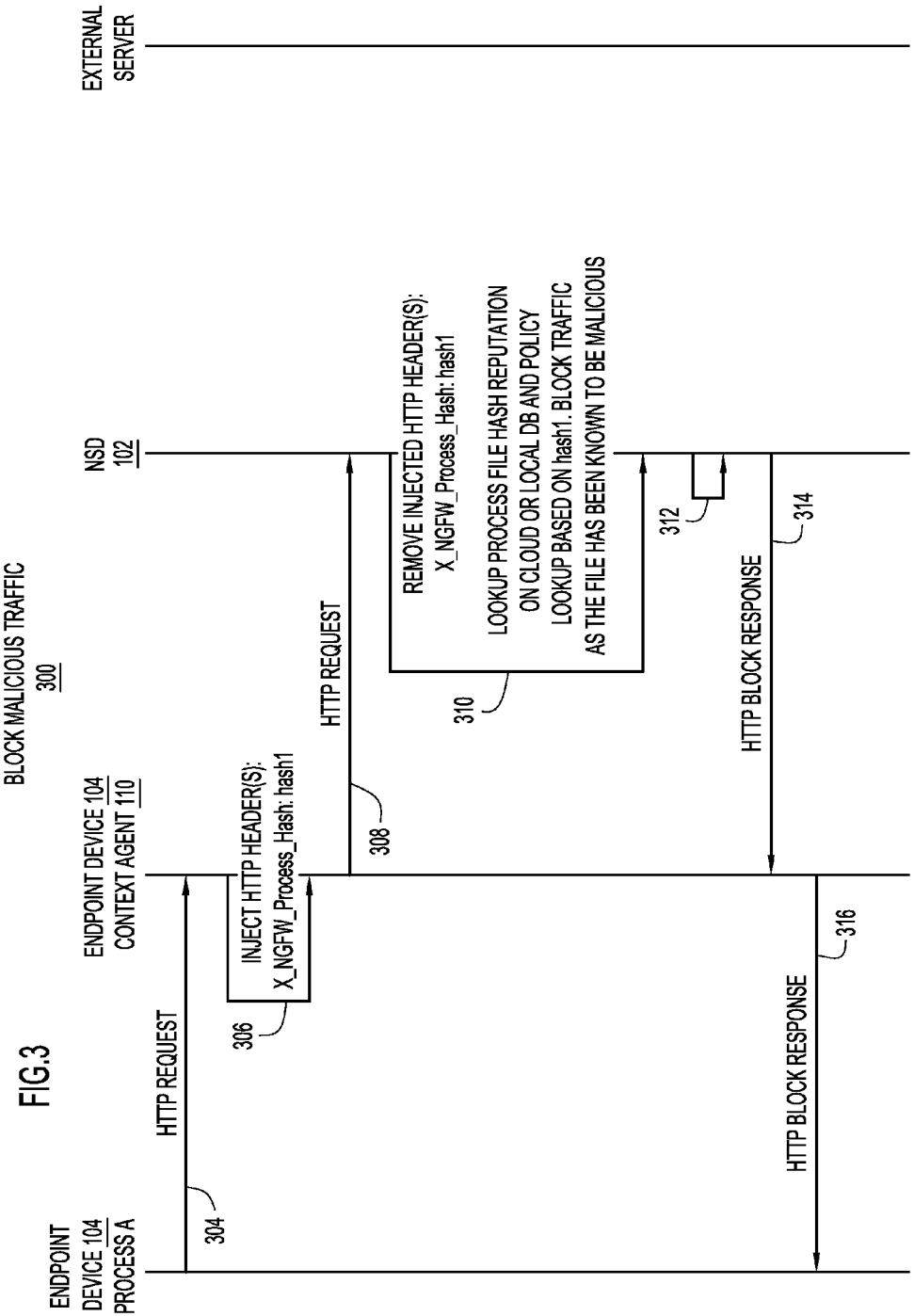

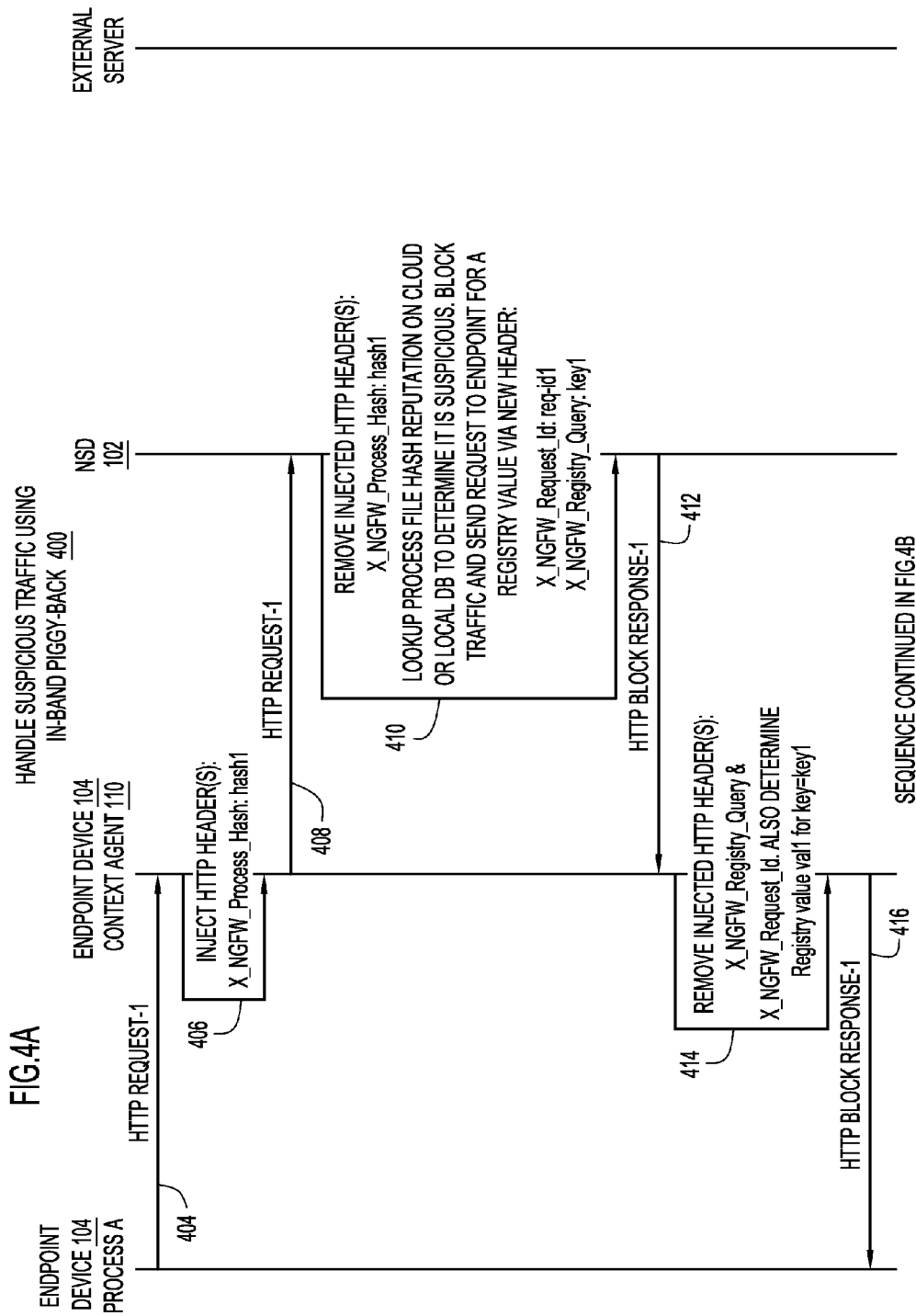

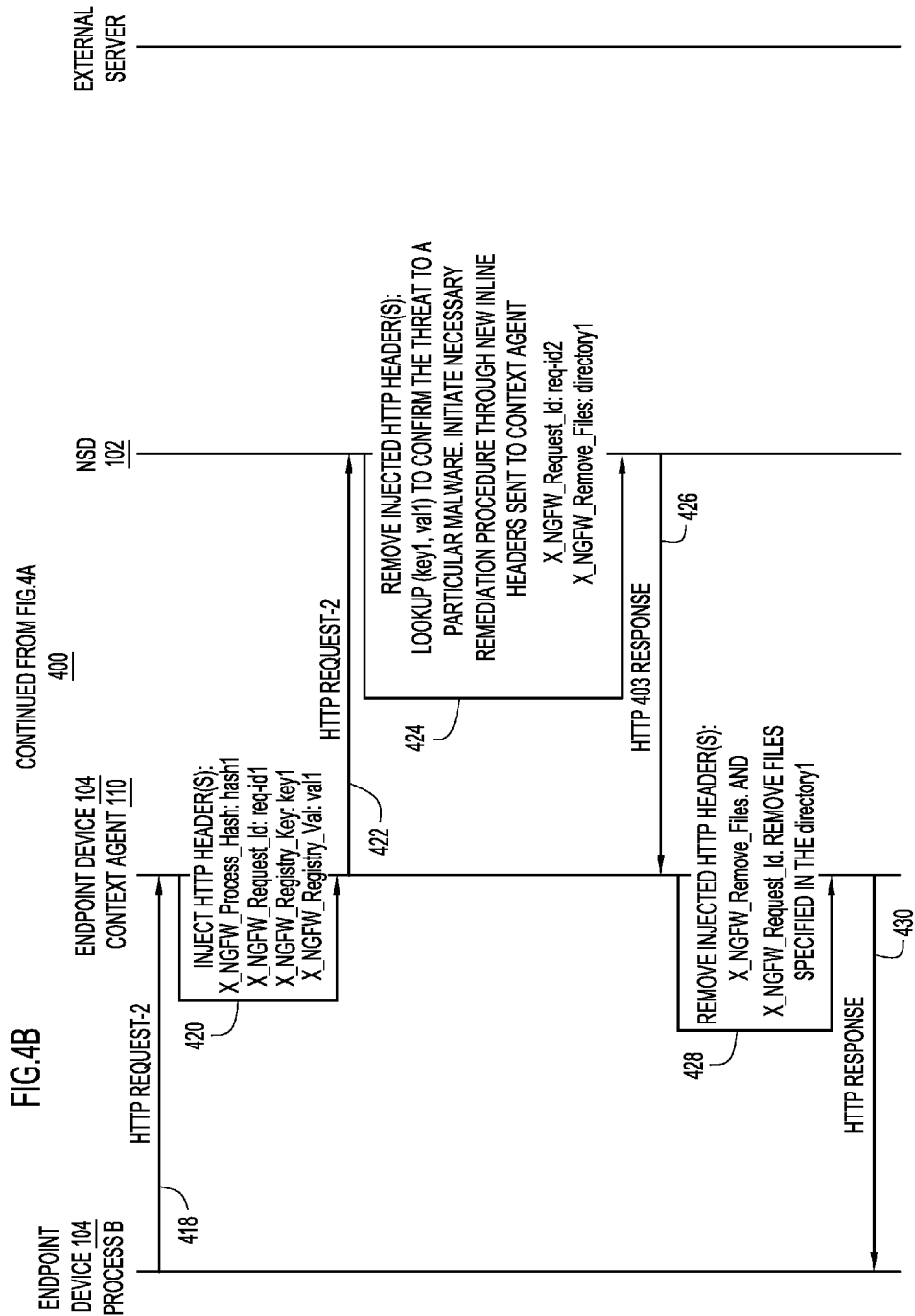

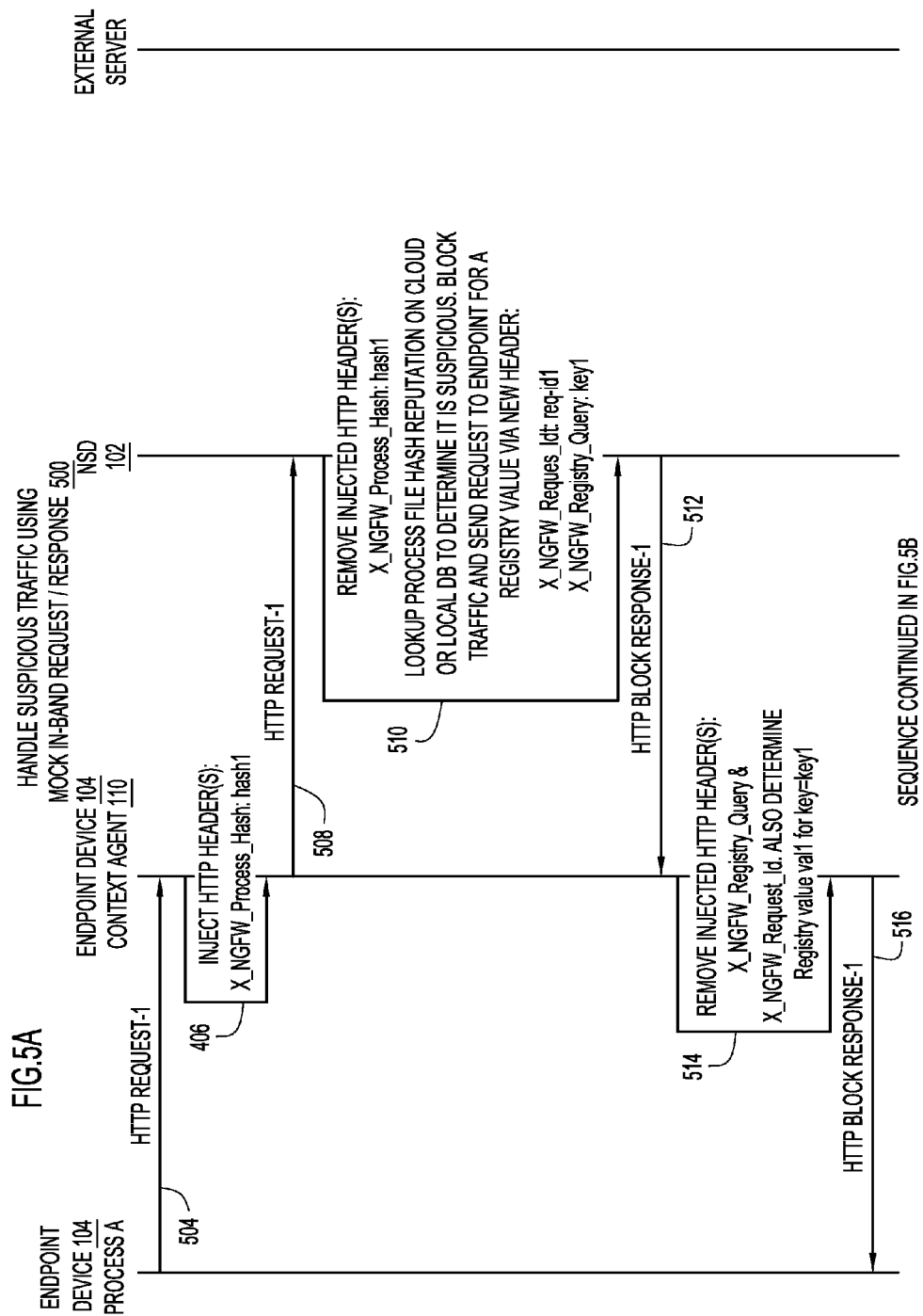

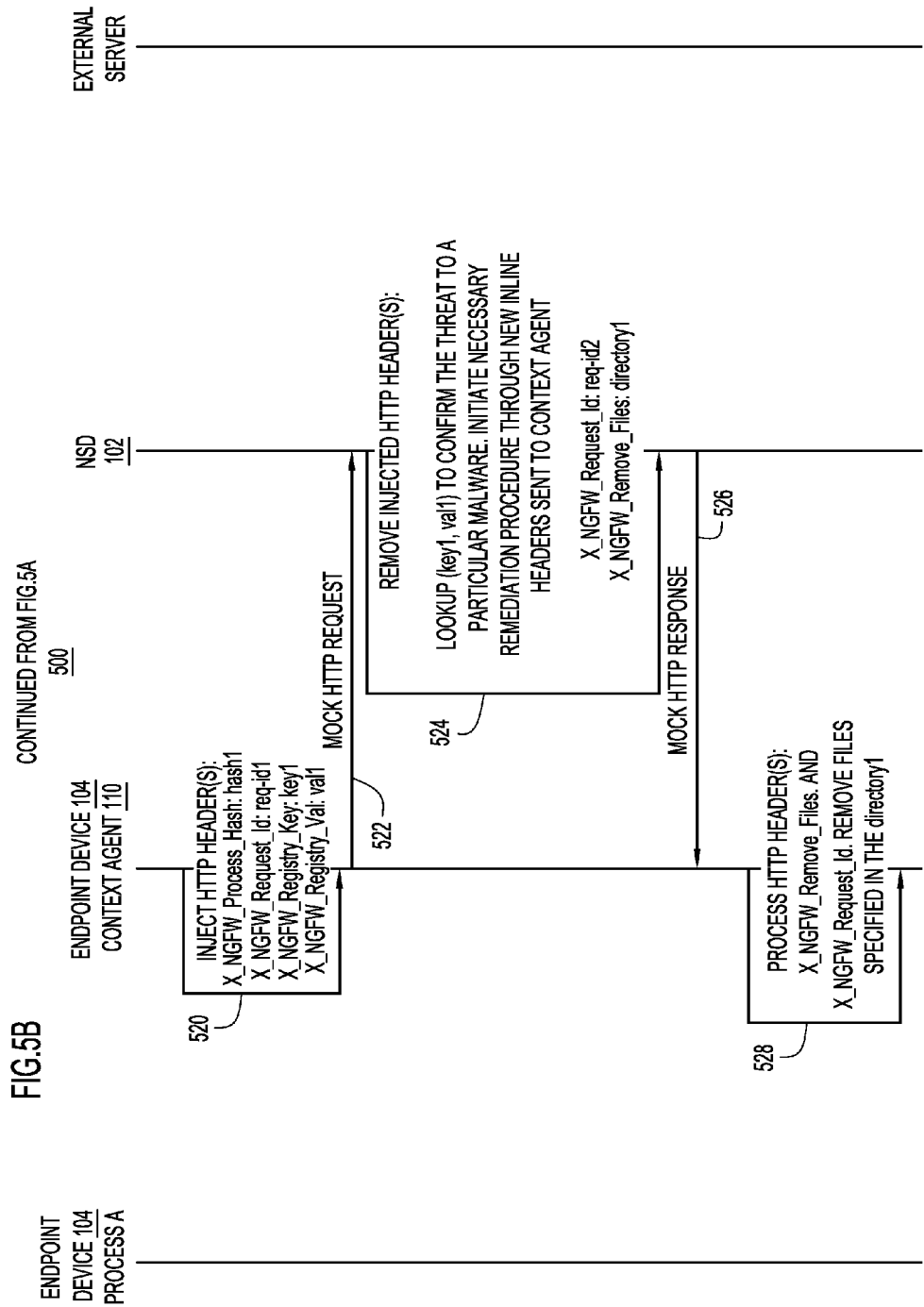

CONTEXT SHARING BETWEEN ENDPOINT DEVICE AND NETWORK SECURITY DEVICE USING IN-BAND COMMUNICATIONS

TECHNICAL FIELD

The present disclosure relates to context sharing between an endpoint device and a network security device.

BACKGROUND

Network security devices or appliances such as firewalls provide advanced security by applying security policies to network traffic flowing through the network security devices at an application level. To do this, the network security devices inspect the network traffic to ascertain actionable/relevant information therein, such as network destinations, ports, protocols, and application-related information, and then apply the security policies based on the ascertained information. As content in the network traffic becomes increasingly encrypted to avoid content inspection, using techniques associated with Secure Hypertext Transfer Protocol (HTTPS) and certificate pinning, for example, it is increasingly difficult for the network security devices to ascertain the actionable/relevant information about the traffic flow. Additionally, modern malware implements various techniques to evade network security devices by using user-agent strings that mimic legitimate applications.

BRIEF DESCRIPTION OF THE DRAWINGS

FIG. 2 is a transaction diagram that shows context sharing between an endpoint device and a network security device of FIG. 1 using in-band communications to allow traffic to pass to a network, according to an example embodiment.

FIG. 3 is a transaction diagram that shows context sharing between the endpoint device and the network security device using in-band communications to block traffic from the network, according to an example embodiment.

FIGS. 4A and 4B are a transaction diagram that shows handling of suspicious traffic by the endpoint device and the network security device using in-band context sharing with piggy-backing, according to an example embodiment.

FIGS. 5A and 5B are a transaction diagram that shows handling of suspicious traffic by the context agent and the network security device using in-band context sharing with mock messages, according to another example embodiment.

DESCRIPTION OF EXAMPLE EMBODIMENTS

Overview

A method is performed at a network security device connected between a network and an endpoint device. The endpoint device is configured to host a client application, and the client application is configured to communicate with the network through the network security device using a request-response protocol. A request destined for the network and seeking an in-band response from the network is received from the client application. The request has a context header including context information about the client application. Whether the client application or a file accessed thereby has a suspicious nature is determined based on the context information. If it is determined that the client application or the file accessed thereby has a suspicious nature, the request is blocked from the network, and a response indicating the block is sent to the client application.

Example Embodiments

Embodiments herein are directed to a network security device connected between a network and an endpoint device. The endpoint device is configured to host a client application, and the client application is configured to communicate with a server/service over the network. This client/server communication is augmented with context that is received by the network security device using an in-band request-response protocol over an application communication channel. A request destined for the network and seeking an in-band response from the network is received from the client application. The request has been augmented with a context header including context information about the client application. Whether the client application or a file accessed thereby has a suspicious nature is determined based on the context information. If it is determined that the client application or the file accessed thereby has a suspicious nature, the request is blocked from the network, and a response indicating the block is sent to the client application. An example network environment in which the embodiments operate are described below in connection with FIG. 1.

Figure 1:
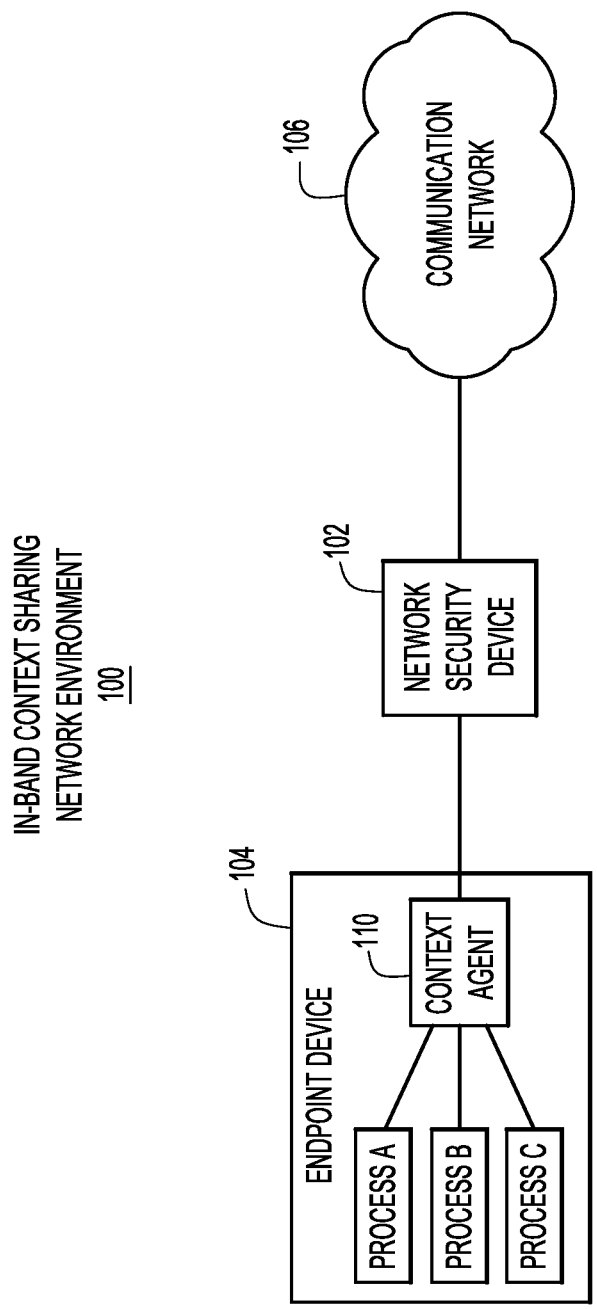
FIG. 1 is a block diagram of a network environment in which embodiments for sharing context information using in-band communications may be implemented, according to an example embodiment.

Referring first to FIG. 1, there is shown a block diagram of an example network environment 100 in which embodiments directed to context sharing may be implemented. Network environment 100 includes a network security device (NSD) 102 connected between an endpoint device or client device 104 and a communication network 106, which may include a wide area network (WAN) such as the Internet in addition to one or more local area networks (LANs). Connections between network security device 102 and endpoint device 104, and between the network security device and communication network 106, may include wired and/or wireless connections. Endpoint device 104 includes compute, network, and storage resources sufficient to host/execute endpoint processes or client applications A-C (each labeled as a "process" in FIG. 1). Endpoint device 104 may be any computer device, including but not limited to, a personal computer such as a laptop computer, a mobile phone, or a computer server. A single endpoint device and a single network security device are shown in FIG. 1 by way of example only; it is understood that network environment may include many client devices and network security devices.

Client applications A-C communicate with communication network 106 through network security device 102. In an example, client applications A-C may communicate with network 106 (i.e., with destinations in the network, such as computer servers) using a request-response protocol, such as a client-server, request-response protocol. Client applications A-C communicating with network 106 through network security device 102 using the request-response protocol are said to be communicating in-band with the network via the network security device, and the requests and responses of the protocol are said to be in-band requests and responses. In one example, client applications A-C may communicate in-band with network 106 through network security device 102 using Secure Hypertext Transfer Protocol (HTTPS), including HTTP over Transport Layer Security (TLS), and HTTP over Secure Sockets Layer (SSL); however, other communication protocols may be used.

Network security device 102 serves as a focal point for in-band network traffic in the form of data packets, e.g., Internet Protocol (IP) packets, flowing from client applications A-C to network 106 and from the network to the client applications. Network security device 102 controls the network traffic in accordance with security policies implemented at the network security device. Network security device 102 may be any network security device, appliance, firewall, next generation firewall (NGFW), or the like. As used herein, the term "network security device" means any entity or instance that implements network security policies, such as any physical device or hardware, virtual device or virtual machine, computer/software application, or service configured to implement the network security policies in connection with the network traffic.

As mentioned above, it has become increasingly difficult for network security device 102 to detect malware in network traffic from legitimate client applications (A-C). For example, network traffic is increasingly encrypted, with no ability to inspect, due to the use of HTTPS and the use of certificate pinning in applications. Additionally, techniques such as user-agent impersonation and use of legitimate sites as relay by malware make detection more difficult. According to embodiments presented herein, a context agent 110 hosted on endpoint device 104 collects context information about or associated with client applications A-C and the host environment of the endpoint device and then incorporates the context information into in-band communications between client applications A-C and network 106 that pass through network security device 102, such that the in-band communications deliver the context information to the network security device 102. That is, context agent 110 incorporates the context information into network traffic destined for network 106, and thereby provides the context information to network device 102 in-band with that network traffic.

The context information enables network security device 102 to ascertain actionable/relevant information associated with client applications A-C and the environment of endpoint device 104, so that the network security device is able to apply appropriate security policies based on the ascertained information. Sending the context information from endpoint point device 104 to network security device 102 using in-band communications, rather than out-of-band or side communications, makes it easier for the network security device and the endpoint device to associate the context information with a specific flow of network traffic associated with a specific one of client applications A-C.

In an embodiment, endpoint context agent 110 inserts optional HTTP headers (e.g., identified with an indicator such as "X-SomeMetadataHeader") directly in a normal HTTP web request. The optional header contains context information about endpoint device 104 and the processes/client application executing or hosted thereon. In a case of encrypted traffic flowing between endpoint device 104 and network security device 102, context agent 110 and the network security device may use the "CONNECT" HTTP method (proxy) in order to annotate context in the optional HTTP header, for example, while not disturbing the normal encrypted traffic flow. The type of context information that may be sent from endpoint device 104 using context headers can be quite extensive. Any information of value to network security device 102 may be exchanged, including, but not limited to, performance characteristics of client applications A-C executing on endpoint device 104, details about the client application binary and loaded modules used by the client application, specific endpoint device system information, such as a make/model/operating system (OS) version/unique device identifiers (UDIDs) of specific devices endpoint devices.

Network security device 102 may request from context agent 110 a specific type of context information that is to be inserted into the traffic flow from endpoint device 104 on a per-endpoint/per-user/per-group basis on demand, based on a network security policy. For example, network security device 102 may request that endpoint device 104 send names and hash values (e.g., SHA256 hash values) of all JavaScript fragments actively executing in an endpoint web browser associated with a specific traffic flow. Additionally, the files or content on endpoint device 104 that is accessed by the web browser may be provided as well.

In order to make the above-described content sharing dynamic, a meta-language attribution may be created to allow the context sharing to provide types of "rich" context without having to update or reconfigure already deployed operational software in endpoint device 104 or network security device 102. This would allow context sharing rules to be dynamically created against a schema that is exchanged at runtime. Such a schema would describe the types of context information available for sharing and relevant descriptions and categorization for the information. For example, a Microsoft Windows Registry may be described using such a schema, allowing network security device 102 to request specific keys or values of the Microsoft Windows Registry from endpoint device 104.

Advanced techniques such as supervised learning may also be used on network security device 102 so that traffic flows from endpoint device 104 (hosting context agent 110) may be learned from in order to associate traffic flows from another endpoint device that might not host a context agent.

Additionally, context sharing may be used in to reduce the volume of in-band data. For example, after a server in network 106 sends a piece of information requested by endpoint device 104 to the endpoint device, the server may also indicate to the endpoint device that the endpoint device is to assign a value to the piece of information and to transmit that value in place of the piece of information in subsequent transmissions (e.g. assign a '1' in place of the piece of information).

Various examples of in-band context sharing in network environment 100 are now described in connection with FIGS. 2-5B.

With reference to FIG. 2, there is an example transaction diagram 200 that shows context sharing between endpoint device 104 and network security device 102 using in-band communications. Transaction diagram 200 represents a situation in which network security device 102 allows "good" traffic to pass from endpoint device 104 to network 106 based on shared context information.

At 204, client application A (designated as "Endpoint process-A" in FIG. 2) originates an HTTP Request destined for a computer server (designated as "External Server" at the right-hand-side of FIG. 2) in network 106. The HTTP Request represents an in-band request. Client application A sends the HTTP Request toward the External Server.

At 206, context agent 110 collects context information about client application A and the environment of endpoint device 104, e.g., about the files accessed by the client application. In an example, the context information may include a hash value (e.g., hash1) of client application A or a file accessed thereby (or both). Context agent 110 intercepts the HTTP Request on its way to the External Server and adds a context header including the collected information to the intercepted HTTP Request. In other words, context agent 110 injects or inserts the context header into the intercepted HTTP Request. In the example of FIG. 2, context agent 110 inserts hash value hash1 into a field labeled "X_NGFW_Process" of the context header that is designated for one or more hash values. The label "X_NGFW . . . " in the context header is an indicator of the presence of the context information in the context header, and that the recipient network security device is a next generation firewall.

At 208, context agent 110 sends the HTTP Request with the context header therein to network security device 102 as an in-band request, which is received the network security device 102.

At 210, network security device 102 removes and recovers the context header from the HTTP Request. Network security device 102 determines whether client application A or a file accessed thereby has a suspicious nature based on the context information in the context header. For example, network security device 102 uses hash value hash1 as an index to lookup a reputation associated with the hash value in a predetermined reputation database that maps hash values to reputations. The predetermined reputation database may be stored locally on network security device 102 or may be accessed from a remote database in network 106, e.g., in the cloud. If the indexed reputation is equal to or exceeds a "trust" threshold, client application A or the file accessed thereby is determined to not to have a suspicious nature (i.e., is trustworthy). On the other hand, if the indexed reputation is below the trust threshold, client application A or the file accessed thereby is determined to be of a suspicious nature, i.e., is not trustworthy.

At 215, assuming the reputation is determined to not be suspicious, network security device 102 forwards the HTTP Request without the context header to the External Server.

At 220, in response to the HTTP Request, the External Server originates an in-band HTTP Response destined for client application A and sends the HTTP Response to network security device 102.

At 225, network security device 102 forwards the HTTP Response to endpoint device 104.

At 230, context agent 110 intercepts the HTTP Response and examines it for a context header.

At 235, assuming context agent 110 does not detect a context header in the intercepted HTTP Response, the context agent simply forwards the intercepted HTTP Response to client application A.

With reference to FIG. 3, there is another example transaction diagram 300 that shows context sharing between endpoint device 104 and network security device 102 using in-band communications. Transaction diagram 300 represents a situation in which network security device 102 blocks malicious traffic from passing from endpoint device 104 to network 106 based on shared context information.

Operations 304-310 in transaction diagram 300 are as described above for operations 204-210 in transaction diagram 200, respectively, except that at operation 310, network security device 102 determines that client application A or a file accessed thereby has a suspicious nature based on the context information (e.g., hash value hash1) included in the context header of the HTTP Request received from endpoint device 104.

At 312, responsive to determining the suspicious nature at operation 310, network security device 102 blocks the HTTP Request, i.e., does not forward the HTTP Request to network 106, creates an HTTP Response indicating the block (designated as an "HTTP Block Response" in FIG. 3), and, at 314, sends the HTTP Response indicating the block to endpoint device 104. Context agent 110 receives/intercepts the HTTP Response indicating the block.

At 316, network security device 102 forwards the HTTP Response indicating the block to client application A.

With reference to FIGS. 4A and 4B, there is an example transaction diagram 400 that shows handling of suspicious traffic by context agent 110 and network security device 102 using in-band context sharing. In transaction diagram 400, context information is "piggy-backed" on existing in-band request-response communications.

Operations 404-408 in transaction diagram 400 are as described above for operations 204-208 in transaction diagram 200, except that the HTTP Request at 404 is identified with a suffix "-1" to indicate the HTTP Request at 404 is a first of two HTTP Requests in transaction diagram 400.

At 410, network security device 102 determines that client application A or a file accessed thereby is of a suspicious nature and, therefore, blocks HTTP Reqeust-1 from network 106. Network security device 102 creates an HTTP Response-1 (i.e., a first HTTP Response in transaction diagram 400) that indicates the block, and adds a context header including context information to HTTP Response-1. The context header of HTTP Response-1 includes a query for further context information from endpoint device 104 associated with the original context information (e.g., hash value hash1) conveyed in HTTP Request-1 and that can be used to confirm the suspicious nature of client application A or any file(s) accessed thereby. In the example of FIG. 4A, the context header in HTTP Request-1 includes (i) a request identifier field "X_NGFW_Request_Id" populated with a request identifier req-id1 (where the designator "X_NGFW" is an indicator of a context header field originated at a next generation firewall), and (ii) a query field "X_NGFW_Registry_Query" populated with a query for registry information (e.g., the further context information) associated with a key key1 associated with the hash value hash1.

At 412, network security device 102 sends HTTP Response-1 (designated as "HTTP Block Response-1" in FIG. 4A) with the context header therein to endpoint device 104 (destined for client application A). Context agent 110 receives/intercepts HTTP Response-1.

At 414, context agent 110 examines HTTP Response-1 (e.g., the HTTP Block Response-1) for a context header and, when the context header is found, removes/recovers the context header from HTTP Response-1. Responsive to the query for further context information in the context header, context agent 110 collects the further context information. In the example of FIG. 4A, context agent 110 collects the registry information associated with key key1 from/associated with an operating system hosted on endpoint device 104. The registry information includes a key-value pair key1-val1.

At 416, context agent 110 forwards HTTP Response-1 without the context header therein to client application A.

At 418, one of client applications A-C originates another or second HTTP Request-2 destined for network 106 (e.g., the External Server or some other server in the network) and transmits the second HTTP Request-2. In the example of FIG. 4B, client application B (designated as "Endpoint Process-B" in FIG. 4B) originates HTTP Request-2. In this way, different client applications in endpoint device 104 may originate the first and second HTTP Requests, although in another example the same client application may originate the first and second HTTP Requests.

At 420, context agent 110 intercepts HTTP Request-2 and adds thereto a context header including the further context information determined/collected by the context agent in operation 414. For example, context agent 110 adds the registry key-value pair key1-val1 to the context header along with the original hash value hash1. Context agent 110 also includes a request identifier (e.g., req-id1) in a request identifier field in the context header of HTTP Request-2 (e.g., in a request identifier field "X_NGFW_Request_Id" of the context header) to associate or tie the context information in the context header back to the query included in the context header of HTTP Response-1. In this way, operation 420 "piggy-backs" the context information collected by context agent 110 at operation 414 on normal, in-band communications from client applications A-C destined for network 106, and associates that context information to the request therefore.

At 422, context agent 110 forwards HTTP Request-2 with the context header therein to network security device 102, which receives HTTP Request-2.

At 424, network security device 102 removes/recovers the context header and context information therein from HTTP Request-2. Network security device 102 confirms the suspicious nature determined initially in operation 410 based on the further context information recovered from HTTP Request-2 (e.g., the registry information). To do this, in one example, network security device 102 uses the registry information as an index into a predetermined malware identity database to confirm the presence of particular malware in endpoint device 104. If the suspicious nature is confirmed, network security device 102 initiates remediation in endpoint device 104 to clear the client application or file(s) accessed thereby that is/are confirmed as suspicious. To do this, network security device 102 creates an HTTP Response (e.g., an HTTP Error/403 Response) and adds a context header thereto that indicates an appropriate remediation procedure. In the example of FIG. 4B, the context header includes (i) a new request identifier (e.g., req-id2), and (ii) a remediation action/command (e.g., remove files at a specified location or directory "directory1" in endpoint device 104).

At 426, network security device 102 sends the HTTP Response (e.g., the HTTP Error/403 Response) to endpoint device 104, and context agent 110 receives/intercepts the HTTP Response.

At 428, context agent 110 removes/recovers the context header in the HTTP Response, and performs the remediation action specified by the context header. For example, context agent 110 removes the files specified in directory1.

At 430, context agent 110 forwards the HTTP Response without the context header to client application B.

With reference to FIGS. 5A and 5B, there is another example transaction diagram 500 that shows handling of suspicious traffic by context agent 110 and network security device 102 using in-band context sharing. In transaction diagram 500, context information in included in simulated or "mock" in-band communications.

Operations 504-516 in transaction diagram 500 are the same as operations 404-416 in transaction diagram 400, respectively. A difference between transaction diagram 500 and transaction diagram 400 is that in transaction diagram 500, context agent 110 does not piggy-back further context information onto a subsequent HTTP Request from one of client applications A-C as is done at 418 and 420 in transaction diagram 400.

Instead, at 520, context agent 110 originates its own simulated or mock in-band HTTP Request, which is therefore not originated at one of client applications A-C and is not intercepted by the context agent, as is the case in transaction diagram 400. Context agent 110 adds the same context header to the Mock HTTP Request as was added to the intercepted HTTP Request-2 at operation 420 in transaction diagram 400.

At 522, context agent 110 sends the Mock HTTP Request with the context header therein to network security device 102, which receives the Mock HTTP Request.

At 524, network security device 102 performs the same operations as at 424, except that the network security device creates a Mock HTTP Response to the Mock HTTP Request received at 522.

At 526, network security device 102 sends the Mock HTTP Response to endpoint device 104, which is received by context agent 110 therein.

At 528, network security device 102 performs the same operations as at 428. Network security device 102 does not forward the Mock HTTP Response to any of client applications A-C because the Mock HTTP Response was created responsive to the Mock HTTP Request that originated at context agent 110, not with any of the client applications.

Figure 6:
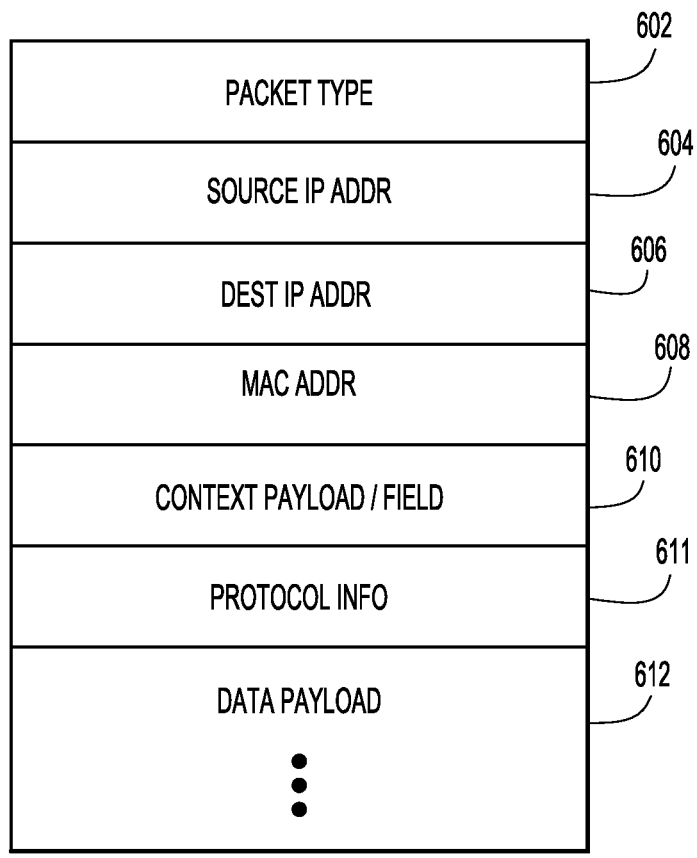
FIG. 6 is an illustration of an in-band data packet including context information, according to an example embodiment.

With reference to FIG. 6, there is an illustration of an example in-band data packet 600 including context information therein. Data packet 600 may be formatted according to any communication protocol used to exchange information between endpoint device 104 and network 106 in in-band communications. Data packet 600 includes a packet type header 602 (e.g., that specifies a type of request or a type of response, a source IP address 604 (e.g., of endpoint device 104 or the External Server)), a destination IP address 606 (e.g., of endpoint device 104 or the External Server), optional MAC addresses 608, a context payload or field 610 for context information as described herein, communication protocol information 611, and a data payload 612. The context payload/field may be in a header of data packet 600 (e.g., a context header) or may be provided elsewhere in data packet 600, e.g., in the middle or at the end of the data packet.

Figure 7:
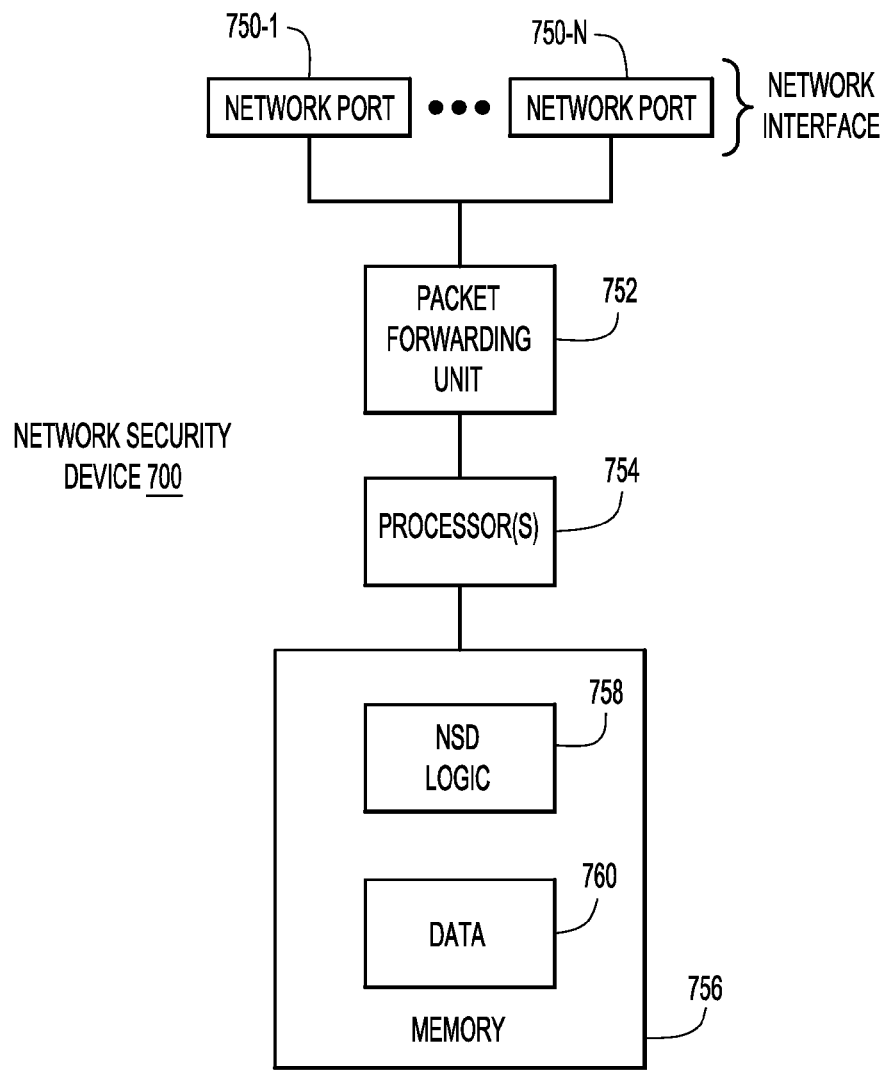
FIG. 7 is a block diagram of a computer system configured to perform network security device methods presented herein, according to an embodiment.

With reference to FIG. 7, there is a block diagram of a computer device or system 700 representative of network security device 102. Computer device 700 may be a network device, such as a network router or a network switch capable of implementing network device security operations, such as those performed by network security device 102. To this end, computer device 700 may include a plurality of network ports 750-1 through 750-N or other form of network interface, a packet forwarding unit 752, a processor 754 (or multiple processors) and memory 756. The memory stores instructions for implementing methods described herein.

The memory 756 may comprise read only memory (ROM), random access memory (RAM), magnetic disk storage media devices, optical storage media devices, flash memory devices, electrical, optical, or other physical/tangible (non-transitory) memory storage devices. The processor 754 is, for example, a microprocessor or a microcontroller that executes instructions stored in memory. Thus, in general, the memory 756 may comprise one or more tangible computer readable storage media (e.g., a memory device) encoded with software comprising computer executable instructions and when the software is executed (by the processor 754) it is operable to perform the operations described herein. Memory 756 stores network security device (NSD) logic 758 to perform the network security device methods/operations described herein. The memory may also store data 760 used and generated by logic 758, such as context information and reputation/malware databases as described above.

Figure 8:
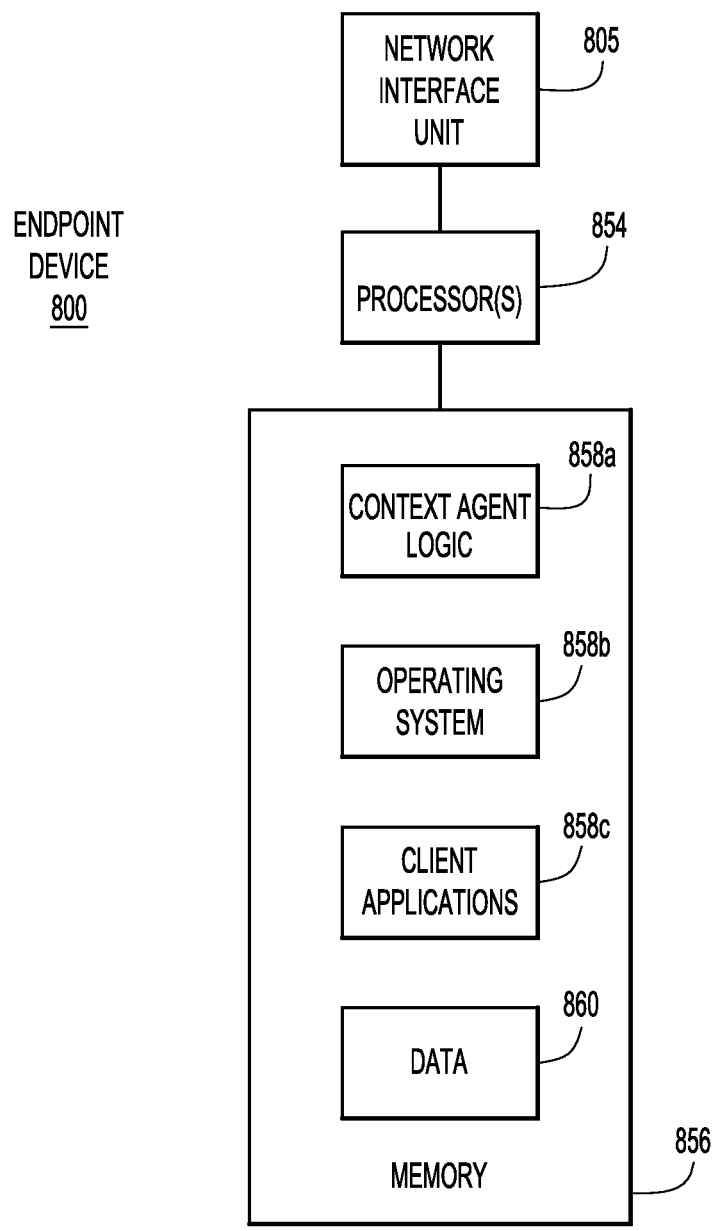
FIG. 8 is a block diagram of a computer system configured to perform endpoint device methods presented herein, according to an embodiment.

With reference to FIG. 8, there is a block diagram of a computer device or system 800 representative of endpoint device 104. Computer device 800 includes a network interface unit 805 to communicate with a network, a processor 854 (or multiple processors), and memory 856. Network interface unit 805 may support wired or wireless connections with the network, and may include an Ethernet card, for example. The memory stores instructions for implementing endpoint device methods described herein.

The memory 856 may comprise read only memory (ROM), random access memory (RAM), magnetic disk storage media devices, optical storage media devices, flash memory devices, electrical, optical, or other physical/tangible (non-transitory) memory storage devices. The processor 854 is, for example, a microprocessor or a microcontroller that executes instructions stored in memory. Thus, in general, the memory 856 may comprise one or more tangible computer readable storage media (e.g., a memory device) encoded with software comprising computer executable instructions and when the software is executed (by the processor 854) it is operable to perform the operations described herein. Memory 856 stores context agent logic 858a to perform the context agent methods/operations described herein, an operating system 858b and associated logic to manage registry information, and one or more client applications 858c. The memory may also store data 860 used and generated by logic 858a-858c, such as context information and registry information as described above.

In summary, an endpoint device exchanges rich context with a network security device, in-band with the flow of data from that endpoint device. This gives to the network security device additional information about an application, device, user, etc., associated with the endpoint device that the network security device may not normally have available. This additional context enables more comprehensive and effective security policies to be implemented on the network security device and also permits the network security device to better detect specific applications, including malware, running on an endpoint device, e.g., malware running in a browser on the endpoint device. Thus, the network security device is able to make more accurate assessments of traffic flows. Also, a network security device administrator may create richer policy sets, such as allowing only specific, verified applications to communicate on a network.

Other advantages are that each context payload, e.g., context header, can be traffic flow specific, not simply device-wide. Additionally, there is the ability for a server in a network to request additional context information, on-demand, via a response header payload in the same traffic flow. Overall, this allows for a device to take action on a specific flow with the additional context information provided, in other words, on a per-request or per-response basis. The context information is not device level, but can actually be per-flow context. Also provided is the ability for the network security device to request additional context attributes, on-demand by inserting an optional HTTP response header that corresponds to an original HTTP request. As an example, the network security device may request "what are the SHA256 hashes of each file created by the process that generated this flow?" This allows for a dynamic ability to introspect an endpoint device on the fly/in real-time. If the network security device needs to collect more analytical data from the endpoint device for a specific flow (e.g. based on engine result of a specific flow analysis), it can do so using technique herein.

To ensure trustworthiness of the in-band context information exchanged between the network security device and the endpoint device, known cryptographic techniques may be used. For example, the endpoint device may use an endpoint certificate to sign the context information (e.g., context payloads). This certificate can be placed in a protected store in the endpoint device and to which only the context agent has access. Additionally, existing endpoint device attestation mechanisms can be employed to attest to a validity and device state of the endpoint device.

In summary, in one form, a method is provided comprising, at a network security device connected between a network and an endpoint device that is configured to host a client application, the client application configured to communicate with the network through the network security device using a request-response protocol: receiving from the client application a request that is destined for the network and that seeks a response from the network, the request having a context header including context information about the client application; determining whether the client application or a file accessed by the client application has a suspicious nature based on the context information; and if it is determined that the client application or the file accessed by the client application has a suspicious nature: blocking the request from the network; and sending to the client application a response indicating the blocking.

In another form, an apparatus is provided comprising a network interface unit including network ports to connect with a network and an endpoint device that is configured to host a client application, the client application configured to communicate with the network through the apparatus using a request-response protocol; and a processor coupled to the network interface and configured to: receive from the client application a request that is destined for the network and that seeks a response from the network, the request having a context header including context information about the client application; determine whether the client application or a file accessed by the client application has a suspicious nature based on the context information; and if it is determined that the client application or the file accessed by the client application has a suspicious nature: block the request from the network; and send to the client application a response indicating the blocking.

In yet another form a method comprising, at a context agent hosted on an endpoint device that is connected with a network security device, the network security device connected with a network, the endpoint point device configured to host a client application configured to communicate with the network through the endpoint context agent and the network security device, using a request-response protocol: receiving from the client application a request destined for the network that seeks a response from the network; collecting context information about the client application; adding to the request a context header that includes the collected context information; sending to the network security device the request with the context header; and receiving from the network security device a response indicating whether the request has been blocked from the network In summary, in yet another form, a non-transitory processor readable medium is provided. The processor readable medium stores instructions that, when executed by a processor, cause the processor to perform the methods described herein.

The above description is intended by way of example only. Various modifications and structural changes may be made therein without departing from the scope of the concepts described herein and within the scope and range of equivalents of the claims.

What is claimed is:

1. A method comprising:
at a network security device connected between a network and an endpoint device that is configured to host a client application, the client application configured to communicate with the network through the network security device using an in-band request-response protocol to which the network security device and the endpoint device add context headers including context information about the client application:
receiving from the client application a request that is destined for the network and that seeks a response from the network, the request having a context header added thereto including context information about the client application;
removing the context header from the request;
determining whether the client application or a file accessed by the client application has a suspicious nature based on the context information;
if the suspicious nature is determined:
blocking the request from the network;
sending to the client application a response indicating the blocking and having added thereto a context header including a query for further information useable to confirm the suspicious nature, and a request identifier associated with the query;
receiving from the endpoint device a second request destined for the network and having added thereto a context header that includes the further information and the request identifier to associate the context header in the second request with the query in the response; and
confirming the suspicious nature based on the further information; and
if the suspicious nature is not determined, forwarding the request without the context header to the network.

2. The method of claim 1, wherein the query for further information includes a query for further information about the client application or the file accessed by the client application that is useable to confirm the suspicious nature of the client application or the file accessed by the client application.

3. The method of claim 2, wherein:
the receiving from the endpoint device the second request includes receiving from the endpoint device the second request destined for the network from either the client application or a different client application;
the confirming the suspicious nature includes confirming the suspicious nature of the client application or the file accessed thereby based on the further information; and
the method further comprises, at the network security device, upon confirming the suspicious nature, sending to the endpoint device a second response having a context header that includes a request to perform remediation with respect to the client application or the file accessed by the client application.

4. The method of claim 3, wherein:
the context information in the context header of the request includes a hash value of the client application or the file accessed by the client application, and the determining includes determining the suspicious nature based on the hash value;
the query in the context header of the response includes a query for operating system registry information of the client application; and
the further information in the context header of the second request includes the operating system registry information, and the confirming includes confirming the suspicious nature based on the operating system registry information.

5. The method of claim 3, wherein the context header in the request and the context header in the response each includes a same request identifier.

6. The method of claim 3, wherein:
the request-response protocol includes the Hypertext Transfer Protocol (HTTP);
the request and the second request include HTTP requests; and
the response and the second response include HTTP responses.

7. The method of claim 1, wherein the request-response protocol includes the Hypertext Transfer Protocol (HTTP).

8. An apparatus comprising:
a network interface unit including network ports to connect with a network and an endpoint device that is configured to host a client application, the client application configured to communicate with the network through the apparatus using an in-band request-response protocol to which the network security device and the endpoint device add context headers including context information about the client application; and
a processor coupled to the network interface and configured to:
receive from the client application a request that is destined for the network and that seeks a response from the network, the request having a context header added thereto including context information about the client application;
remove the context header from the request;
determine whether the client application or a file accessed by the client application has a suspicious nature based on the context information; and
if the suspicious nature is determined:
block the request from the network;
send to the client application a response indicating the blocking and having added thereto a context header including a query for further information useable to confirm the suspicious nature, and a request identifier associated with the query;
receive from the endpoint device a second request destined for the network and having added thereto a context header that includes the further information and the request identifier to associate the context header in the second request with the query in the response; and
confirm the suspicious nature based on the further information; and
if the suspicious nature is not determined, forward the request without the context header to the network.

9. The apparatus of claim 8, wherein the query for further information includes a query for further information about the client application or the file accessed by the client application that is useable to confirm the suspicious nature of the client application or the file accessed by the client application.

10. The apparatus of claim 9, wherein:
the processor is configured to receive from the endpoint device the second request by receiving from the endpoint device the second request destined for the network from either the client application or a different client application;
the processor is configured to confirm the suspicious nature by confirming the suspicious nature of the client application or the file accessed thereby based on the further information; and
the processor is further configured to, upon confirming the suspicious nature, send to the endpoint device a second response having a context header that includes a request to perform remediation with respect to the client application or the file accessed by the client application.

11. The apparatus of claim 10, wherein:
the context information in the context header of the request includes a hash value of the client application or the file accessed by the client application, and the processor is configured to determine by determining the suspicious nature based on the hash value;
the query in the context header of the response includes a query for operating system registry information of the client application; and
the further information in the context header of the second request includes the operating system registry information, and the processor is configured to confirm by confirming the suspicious nature based on the operating system registry information.

12. The apparatus of claim 10, wherein:
the context header in the request and the context header in the response each includes a same request identifier.

13. The apparatus of claim 8, wherein the request-response protocol includes the Hypertext Transfer Protocol (HTTP).

14. A method comprising:
at a context agent hosted on an endpoint device that is connected with a network security device, the network security device connected with a network, the endpoint device configured to host a client application configured to communicate with the network through the endpoint context agent and the network security device, using an in-band request-response protocol to which the network security device and the endpoint device add context headers including context information about the client application:
receiving from the client application a request destined for the network that seeks a response from the network;
collecting context information about the client application;
adding to the request a context header that includes the collected context information;
sending to the network security device the request with the context header;
receiving from the network security device a response indicating whether the request has been blocked from the network, wherein the response includes a context header added thereto by the network security device, the context header in the response including a query for further context information about the client application that is useable to confirm a suspicious nature thereof, and a request identifier associated with the query, and responsive to the query:
collecting the further context information about the client application;
adding to the second request a context header including the further context information and the request identifier to associate the context header in the second request with the query in the response; and
sending to the network security device the second request with the context header; and
removing the context header from the response and sending the response without the context header to the client application.

15. The method of claim 14, further comprising, at the context agent:
receiving from the network security device a second response that is responsive to the second request.

16. The method of claim 15, wherein the second response from the network security device includes a context header having a command to initiate remediation on the endpoint device with respect to the client application, the method further comprising: responsive to the command to initiate remediation, initiating the remediation on the endpoint device with respect to the client application.

17. The method of claim 15, wherein:
the request-response protocol includes the Hypertext Transfer Protocol (HTTP);
the request and the second request include HTTP requests; and
the response and the second response include HTTP responses.

18. The method of claim 15, wherein:
the context header including the query in the response from the network security device and the context header including the further context information from the context agent each includes a same request identifier to associate the further context information with the query.

19. The method of claim 15, wherein;
the collecting the context information includes collecting a hash value of the client application or a file accessed thereby, and the adding includes adding the collected hash value to the context header of the request; and
the collecting the further context information includes collecting operating system registry information related to the client application, and the adding the further context information includes adding the operating system registry information to the context header of the second request.

20. The method of claim 15, further comprising, at the context agent:
receiving the second request from the client application without any context header therein,
wherein the adding the further context information includes adding the further context information to the second request received from the client application.

21. The method of claim 15, further comprising, at the context agent:
originating the second request as a mock request that does not originate at the client application,
wherein the adding includes adding the collected further context information to the context header of the mock request originated at the context agent.

22. The method of claim 14, wherein the request-response protocol includes the Hypertext Transfer Protocol (HTTP).

* * * * *